United States Patent
Komatsu et al.

(10) Patent No.: US 6,867,935 B2
(45) Date of Patent: Mar. 15, 2005

(54) MAGNETIC TRANSFER APPARATUS

(75) Inventors: Kazunori Komatsu, Kanagawa-ken (JP); Toshihiro Usa, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 165 days.

(21) Appl. No.: 10/406,189

(22) Filed: Apr. 4, 2003

(65) Prior Publication Data
US 2003/0189775 A1 Oct. 9, 2003

(30) Foreign Application Priority Data
Apr. 4, 2002 (JP) ........................................ 2002/102549

(51) Int. Cl.$^7$ ................................................. G11B 5/86
(52) U.S. Cl. ................... 360/17; 360/16; 428/694.07 P
(58) Field of Search ....................... 360/15–17; 428/694

(56) References Cited

U.S. PATENT DOCUMENTS

| 6,347,016 B1 | 2/2002 | Ishida et al. |
| 6,650,490 B2 * | 11/2003 | Nishikawa .................... 360/17 |
| 6,794,062 B2 * | 9/2004 | Tsubata et al. ................ 360/15 |
| 2003/0113503 A1 * | 6/2003 | Nakamura et al. ...... 428/694 TP |
| 2004/0080871 A1 * | 4/2004 | Usa et al. .................... 360/135 |

FOREIGN PATENT DOCUMENTS

| JP | 63-183623 | 7/1988 |
| JP | 2001-14667 | 1/2001 |

* cited by examiner

Primary Examiner—Andrew L. Sniezek
Assistant Examiner—Glenda Rodriguez
(74) Attorney, Agent, or Firm—Sughrue Mion, PLLC

(57) ABSTRACT

A magnetic transfer apparatus for magnetically transferring information represented by a pattern of a magnetic layer formed on a master information carrier to a slave medium includes a magnet unit which applies an initial DC magnetic field to a slave medium and a magnet unit which applies a transfer magnetic field to the slave medium and the master information carrier in the direction opposite to the direction of the initial-magnetization with the slave medium held in close contact with the master information carrier. The initial DC magnetic field and the transfer magnetic field are not larger than the diameter of an innermost recording track in the half-width of a curve representing an intensity distribution in the direction of a tangent of the innermost recording track.

16 Claims, 8 Drawing Sheets

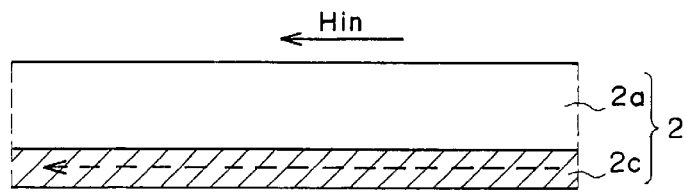
FIG.7A
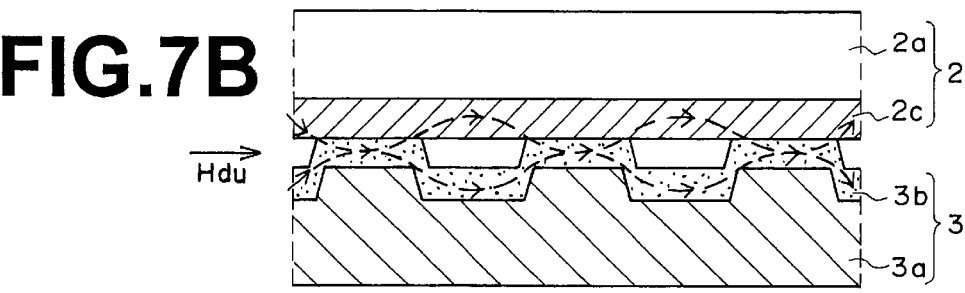
FIG.7B
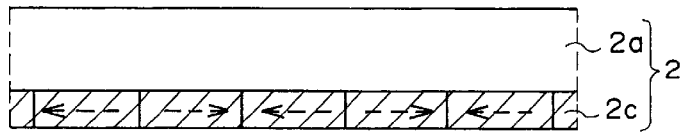
FIG.7C
FIG.8
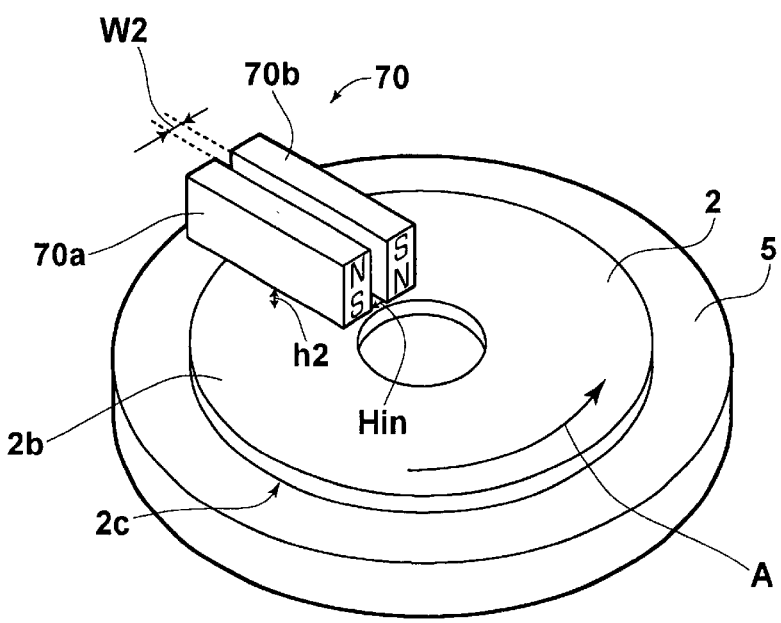

MAGNETIC TRANSFER APPARATUS

BACKGROUND OF THE INVENTION

1. Field of the Invention

This invention relates to a magnetic transfer apparatus for transferring information to a magnetic recording medium (slave medium) from a master information carrier carrying thereon a magnetic layer pattern representing the information to be transferred to the magnetic recording medium.

2. Description of the Related Art

With an increase in information quantity, there is a demand for a magnetic recording medium which is high in capacity, low in cost and preferably requires a short time to read out a necessary part of data (a magnetic recording medium which allows so-called high-speed access). As an example of such a magnetic recording medium, there has been known a high recording density magnetic medium such as a hard disc or a flexible disc. To realize the high capacity, so-called servo tracking technology for causing a magnetic head to accurately trace narrow data tracks plays an important role. To perform the servo tracking, a servo tracking signal, an address information signal, a reproduction clock signal and the like are recorded on the disc at certain intervals as so-called preformat.

As a method of recording the preformat accurately and efficiently, there has been proposed, for instance, in Japanese Unexamined Patent Publication No. 63(1988)-183623 and U.S. Pat. No. 6,347,016, a magnetic transfer method in which a pattern which is formed on a master information carrier and represents servo information is copied to a magnetic recording medium (a slave medium) by magnetic transfer.

In the magnetic transfer, a master information carrier having thereon an irregularity pattern (a pattern of protruding portions and recessed portions) representing information (e.g., servo information) to be transferred to a slave medium (a magnetic recording medium such as a magnetic disc) and a magnetic layer formed at least on the protruding portions is brought into a close contact with the slave medium and a transfer magnetic field is applied to the master information carrier and the slave medium in a close contact with each other, whereby a magnetization pattern corresponding to the information represented by the irregularity pattern is magnetically transferred from the master information carrier to the slave medium. Accordingly, the information carried by the master information carrier can be statically recorded on the slave medium with the relative position between the master information carrier and the slave medium kept constant. Thus, according to the magnetic transfer, the preformat recording can be performed accurately and the time required for the preformat recording is very short.

We, this applicant, have proposed in Japanese Unexamined Patent Publication No. 2001-14667 a method of magnetic transfer in which the magnetic layer of the slave medium is initially magnetized in one direction of the recording tracks and a transfer magnetic layer is applied to the slave medium in the direction opposite to the direction of the initial-magnetization with the slave medium held in close contact with the master information carrier. By this method, a very good magnetic transfer can be effected.

An optimal intensity of the transfer magnetic field is substantially the same as the coercive force Hc of the slave medium and an optimal intensity of the initial DC magnetic field is about twice the coercive force Hc of the slave medium.

As a method of applying the initial DC magnetic field or the transfer magnetic field to the slave medium, a method in which a local magnetic field is generated in an area of the recording track in a tangential direction of the track and a magnetic field is applied over the entire area of the track by rotating the slave medium relatively to the local magnetic field can be considered. Since the magnetic field in a tangential direction of the track is in parallel to the track at the point of contact between the track and the tangent, it is considered that a magnetic field can be applied over the entire area of the track by rotating the slave medium relatively to the local magnetic field. However, since a magnetic field actually generated by a magnetic field generating means has certain spread in a tangential direction, an area of the track deviated from the point of contact between the track and the tangent undergoes a magnetic field in a direction deviated from the direction of the track. When the intensity of a magnetic field in a direction deviated from the direction of the track is strong, the initial magnetization pattern or the transfer magnetization pattern of the area subjected to the magnetic field is disturbed and the magnetic transfer cannot be accurate. In the case where the signal to be transferred is a servo signal, satisfactory tracking function cannot be obtained on the slave medium, which deteriorates the reliability of the slave medium.

SUMMARY OF THE INVENTION

In view of the foregoing observations and description, the primary object of the present invention is to provide an improved magnetic transfer apparatus which comprises an initial magnetization means and a transfer magnetic field application means which generate a local magnetic field and apply a magnetic field by rotating a slave medium relatively to the local magnetic field and in which the magnetization pattern can be accurately transferred to the slave medium.

In accordance with the present invention, there is provided a magnetic transfer apparatus for magnetically transferring information represented by a pattern of a magnetic layer formed on a master information carrier to a magnetic layer of a slave medium comprising an initial magnetization means which applies an initial DC magnetic field to a disc-like slave medium while rotating the slave medium relatively to the initial DC magnetic field to initially magnetize the magnetic layer of the slave medium in one direction of concentric recording tracks thereof and a transfer magnetic field application means which applies a transfer magnetic field to the slave medium and the master information carrier in the direction opposite to the direction of the initial-magnetization while integrally rotating the slave medium and the master information carrier relatively to the transfer magnetic field with the initially-magnetized magnetic layer of the slave medium held in close contact with the magnetic layer on the master information carrier, wherein the improvement comprises that the initial DC magnetic field and the transfer magnetic field respectively applied by the initial magnetization means and the transfer magnetic field application means are not larger than the diameter of an innermost recording track in the half-width of a curve representing an intensity distribution in the direction of a tangent of the innermost recording track on the surface of the slave medium.

The "concentric recording tracks thereof (of the slave medium" means recording tracks to be formed on the slave medium by magnetic transfer.

The expression "to transfer information" means to pattern the arrangement of magnetization of the magnetic layer of the slave medium in a pattern according to the information.

The intensity of the initial DC magnetic field is preferably not lower than the coercive force of the magnetic layer of the slave medium, more preferably not lower than 1.2 times the coercive force of the same and most preferably not lower than about twice the coercive force of the same.

The intensity of the transfer magnetic field is preferably not lower than about 0.6 times the coercive force of the magnetic layer of the slave medium and not higher than about 1.3 times the coercive force of the magnetic layer of the slave medium.

As the magnetic field generator for applying the initial DC magnetic field and the transfer magnetic field, for instance, an electromagnet unit or a permanent magnet unit may be employed. In the case where an electromagnet unit is employed as the magnetic field generator, a magnetic field is generated by an electromagnet having a gap extending in a radial direction of the slave medium in a direction parallel to the recording track of the slave medium (the direction of a tangent of the track), and the slave medium is rotated relatively to the magnetic field so that the magnetic field is applied over the entire area of the track. In the case where a permanent magnet unit is employed as the magnetic field generator, a pair of permanent magnets are disposed so that they extend in a radial direction of the slave medium in parallel to each other at a predetermined distance from each other and the end faces opposed to the surface of the slave medium are opposite in polarity, and the slave medium is rotated relatively to the magnetic field generated between the permanent magnets in a direction parallel to the recording track of the slave medium.

Especially, in the initial magnetization requiring a strong magnetic field, the gap in the electromagnet or the gap between the permanent magnets is preferably not larger than half of the radius of the slave medium. The distance between the surface of the slave medium and the electromagnet unit or the permanent magnetic unit is preferably not larger than 10 mm, more preferably not larger than 5 mm and most preferably not larger than 3 mm.

The permanent magnet unit may be provided with a third permanent magnet which is magnetized in perpendicular to the direction of magnetization of the aforesaid permanent magnets and disposed between the aforesaid permanent magnets in a direction to enhance the magnetic field between the aforesaid permanent magnets.

When, the initial DC magnetic field and the transfer magnetic field respectively applied by the initial magnetization means and the transfer magnetic field application means are not larger than the diameter of an innermost recording track in the half-width of a curve representing an intensity distribution in the direction of a tangent of the innermost recording track, turbulence of the initial magnetization pattern or the transfer magnetization pattern can be suppressed over the entire area of the recording track from the innermost track to the outermost track, whereby an optimal magnetic transfer can be realized.

BRIEF DESCRIPTION OF THE DRAWINGS

FIGS. 7A to 7C are views for illustrating basic steps of magnetic transfer, FIG. 8 is a perspective view showing another example of the initial magnetization system.

DESCRIPTION OF THE PREFERRED EMBODIMENTS

A pair of pieces of information are transferred to opposite sides (upper and lower sides $2b$ and $2c$) of a slave medium 2 by a magnetic transfer apparatus in accordance with a first embodiment of the present invention from a pair of master information carriers 3 and 4. The slave medium 2 is a disc-like magnetic recording medium such as a hard disc, a flexible disc or the like. That is, in this particular embodiment, the slave medium 2 is a double-sided magnetic recording medium having a magnetic layer on each of its upper and lower sides $2b$ and $2c$.

Figure 6:
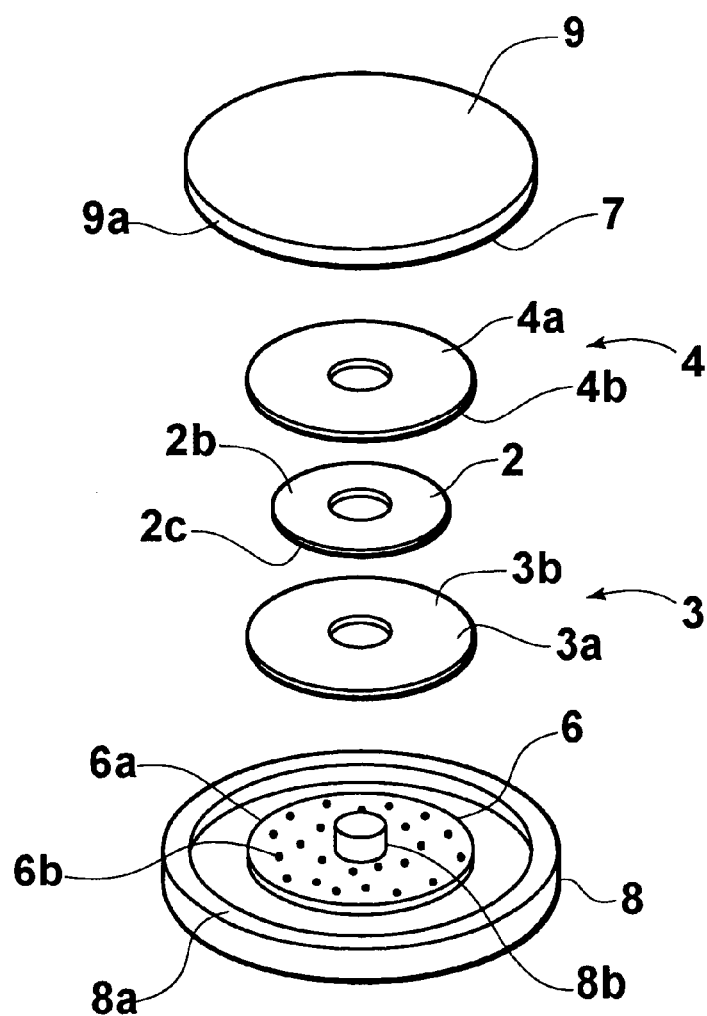
FIG. 6 is an exploded perspective view of the holder.

As shown in FIG. 6, the master information carriers 3 and 4 are like a disc in shape and comprises substrates $3a$ and $4a$ having on their one sides irregularity patterns (patterns of protruding portions and recessed portions) representing information to be transferred to the magnetic layers of the magnetic recording media (slave media) and soft magnetic layers $3b$ and $4b$ provided on the surface of the substrates $3a$ and $4a$. The irregularity patterns respectively carried by the master information carriers 3 and 4 represent information to be transferred to the lower magnetic layer $2c$ and the upper magnetic layer $2b$ of the slave medium 2. The information carried by the master information carriers 3 and 4 may be transferred to opposite sides $2b$ and $2c$ of the slave medium 2 either simultaneously or in sequence.

Figure 1:
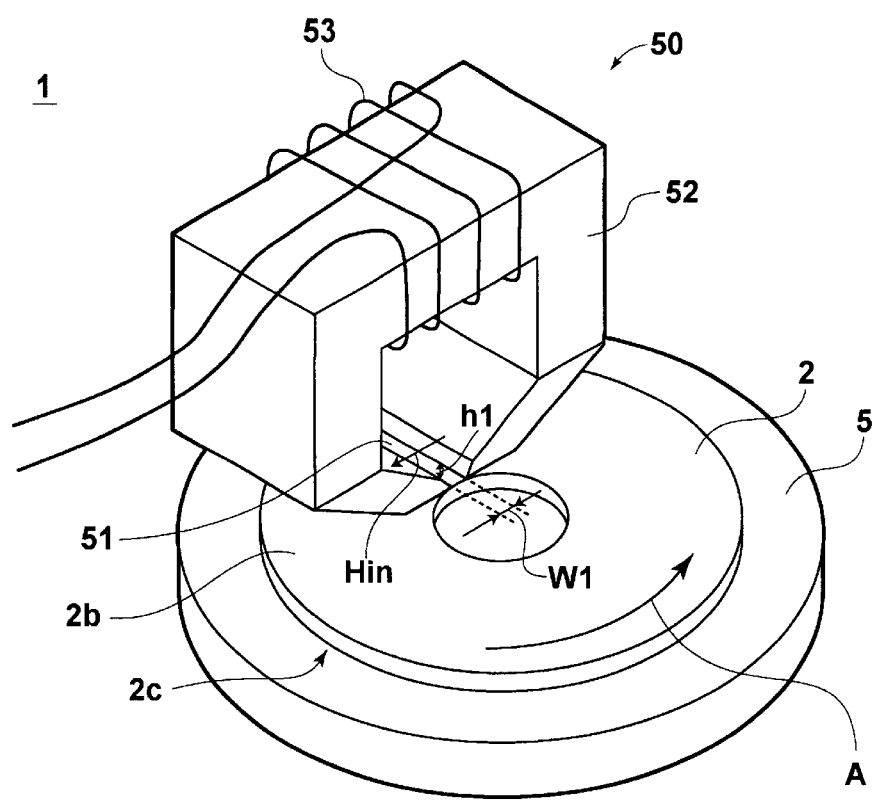
FIG. 1 is a perspective view showing an important part of the initial magnetization system employed in a magnetic transfer system in accordance with a first embodiment of the present invention.

The slave medium 2 is first applied with an initial DC magnetic field Hin by an initial magnetization system 1 shown in FIG. 1 and the magnetic layers of the slave medium 2 is initially magnetized in one direction of recording tracks. The initial magnetization system 1 shown in FIG. 1 comprises a support table 5 which supports the slave medium 2 from the lower side $2c$ thereof, an electromagnet unit (a magnetic field generator) 50 held on the upper side $2b$ of the slave medium 2, and a rotating means (not shown) which rotates the support table 5 relatively to the electromagnet unit 50 in the direction of arrow A.

The electromagnet unit 50 comprises a core 52 having a gap 51 which radially extends at least from an innermost track Ta to an outermost track Tb of the slave medium 2 and a winding 53 wound around the core 52.

Figure 2A:
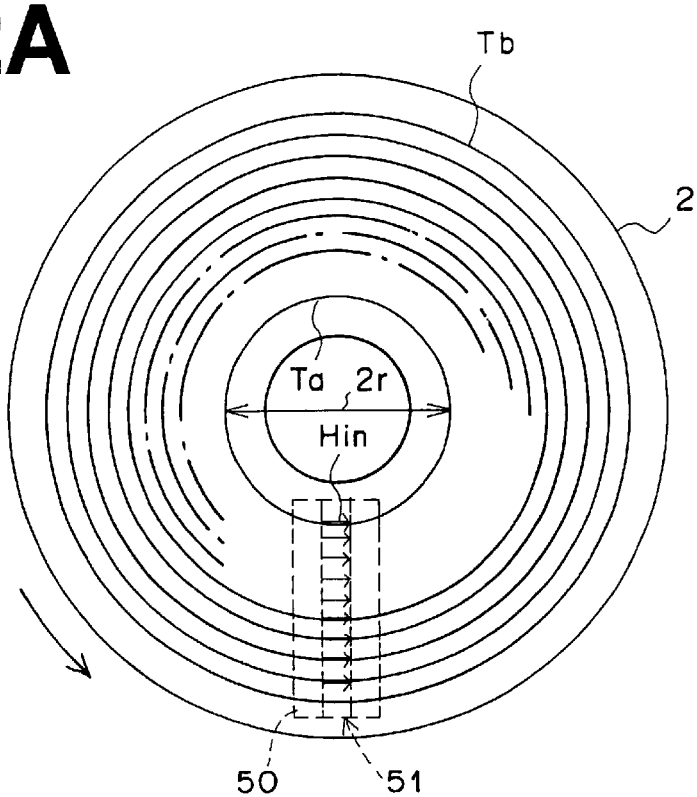
FIGS. 2A and 2B are views for illustrating the initial magnetization system shown in FIG. 1, FIGS. 3A and 3B are views for illustrating the initial magnetization system shown in FIG. 1.
Figure 2B:
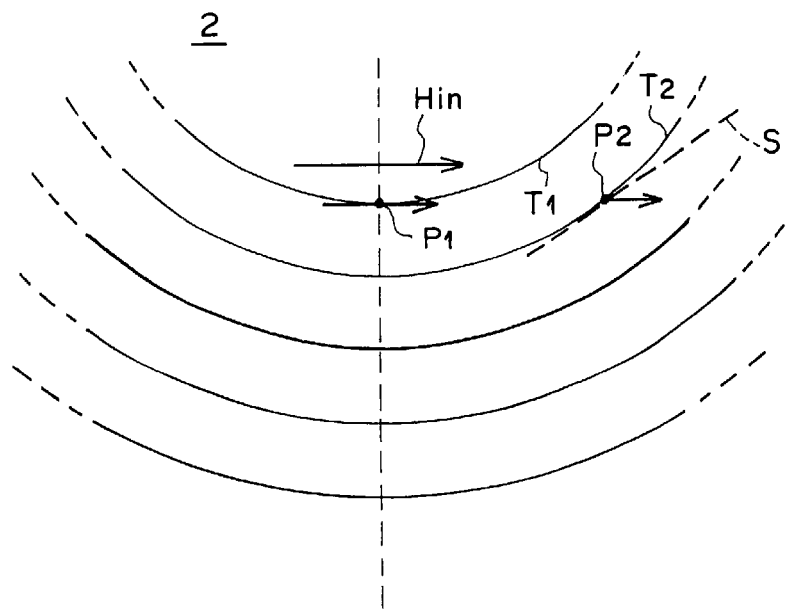
Figure 3A:
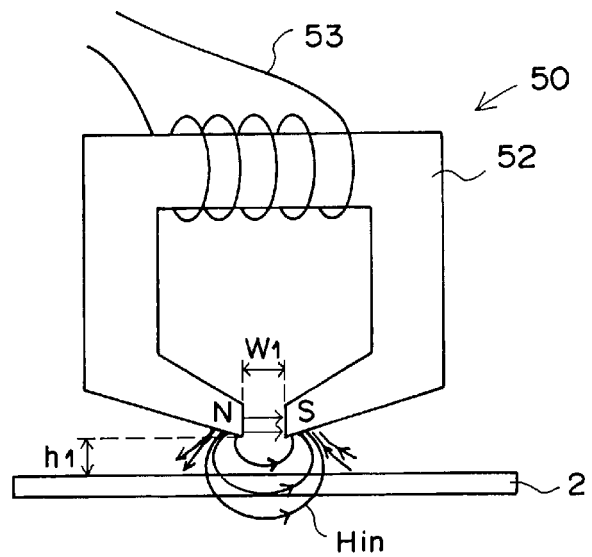

FIG. 2A is a plan view for illustrating the direction in which the initial DC magnetic field is applied to the slave medium 2 and FIG. 2B is a view showing a part of FIG. 2A in an enlarged scale. FIG. 3A is a side view showing the electromagnet unit 50 and FIG. 3B shows the intensity distribution, on the surface of the slave medium 2 in the direction of a tangent, of a magnetic field actually generated by the electromagnet unit 50.

The electromagnet unit 50 generates an initial DC magnetic field Hin across the gap 51 in parallel to the direction of the recording track. Accordingly, by rotating the slave medium 2 once or more relatively to the initial DC magnetic field Hin, the initial DC magnetic field Hin parallel to the concentric recording tracks can be applied to over the entire recording track area.

Figure 3B:
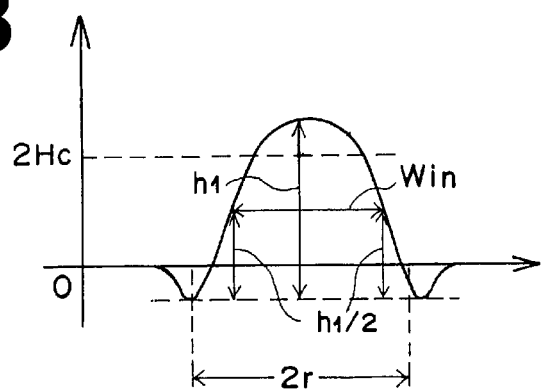

The magnetic field generated by the electromagnet unit 50 exhibits an intensity distribution on the surface of the slave medium 2 in the direction of a tangent, having a peak at the center of the gap 51 as shown in FIG. 3B. Since the magnetic field has certain spread in a tangential direction as shown in FIG. 3B, assuming that the initial DC magnetic field Hin is directed in parallel to a direction of a tangent which contacts with a recording track at a point P1, though the initial DC magnetic field Hin can be applied in a direction parallel to the recording track at the point P1, an area of the track deviated from the point P1 of contact between the track and the tangent undergoes an initial DC magnetic field Hin in a direction deviated from the direction of the track, e.g., point P2 on track T2 under goes a magnetic field in a direction deviated from the tangent S at the point P2. When the intensity of the initial DC magnetic field in a direction deviated from the direction of the track is strong, the initial DC magnetization pattern of the area subjected to the magnetic field is disturbed.

In order to overcome this problem, the initial DC magnetic field Hin is limited to not larger than the diameter 2r of an innermost recording track Ta in the half-width Win of a curve representing an intensity distribution in the direction of a tangent of the innermost recording track Ta. By so setting the intensity of the initial DC magnetic field Hin, turbulence of the initial magnetization pattern can be suppressed over the entire area of the recording track from the innermost track to the outermost track, whereby an optimal initial magnetization can be realized.

In this particular embodiment, the width w1 of the gap 51 is set to be not larger than half of the radius r of the innermost recording track and the distance h1 between the gap 51 and the upper surface of the slave medium is set to be not larger than 5 mm (preferably 3 mm) so that the initial DC magnetic field applied to the slave medium is not weaker than twice the coercive force of the magnetic layer of the slave medium 1 on both the sides of the slave medium 2. For example, when the radius of the innermost recording track is 20 mm, the width w1 of the gap 51 is set to be not larger than 10 mm (preferably not larger than 5 mm).

Figure 4:
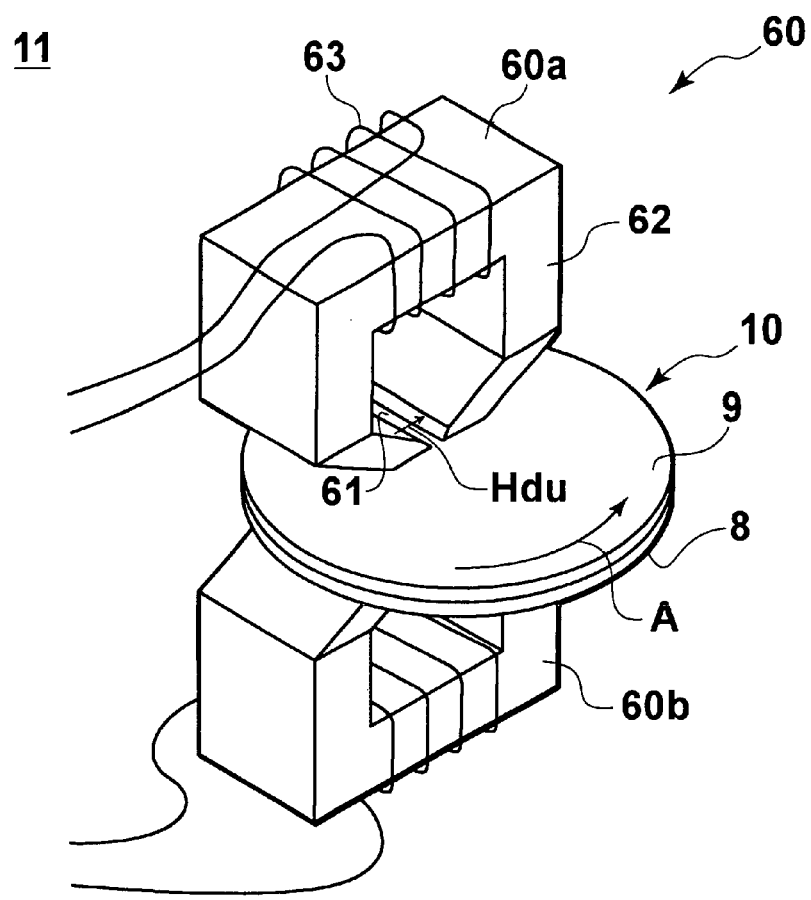
FIG. 4 is a perspective view showing an important part of the transfer magnetic field application system employed in the magnetic transfer system shown in FIG. 1, FIGS. 5A and 5B are views for illustrating the transfer magnetic field application system shown in FIG. 4.

After the magnetic layers on the upper and lower sides 2b and 2c are thus initially magnetized, the slave medium 2 together with the lower and upper master information carriers 3 and 4 held in close contact with the lower and upper side of the slave medium 2 is applied with a transfer magnetic field Hdu by a transfer magnetic field application system 11 shown in FIG. 4. The transfer magnetic field application system 11 comprises a holder 10 which holds the slave medium 2 and the master information carriers 3 and 4 in close contact with each other covering the upper and lower sides of the slave medium/master information carrier assembly, a magnetic field generator 60 having upper and lower electromagnet units 60a and 60b respectively opposed to the upper and lower sides 2b and 2c of the slave medium 2 and a rotating means (not shown) which rotates the holder 10 in the direction of arrow A relatively to the magnetic field generator 60.

Each of the upper and lower electromagnet units 60a and 60b of the magnetic field generator 60 comprises a core 62 having a gap 61 which radially extends at least from the innermost track Ta to the outermost track Tb of the slave medium 2 and a winding 63 wound around the core 62, and the upper and lower electromagnet units 60a and 60b generate magnetic fields parallel to the direction of the tracks in the same direction on opposite sides of the slave medium 2. It is not necessary to provide an electromagnet on each side of the slave medium but an electromagnet may be provided only on one side of the slave medium 2.

Figure 5A:
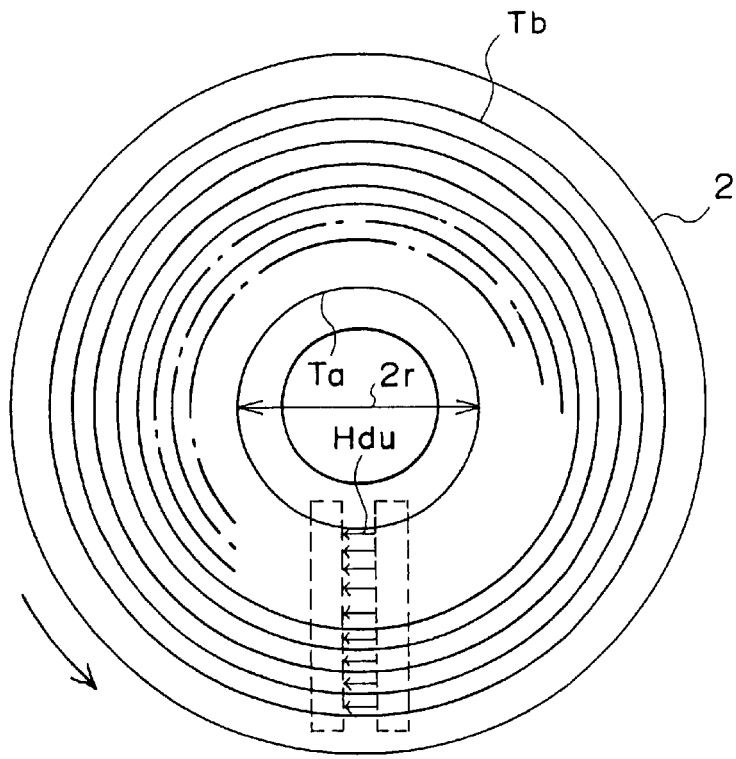
Figure 5B:
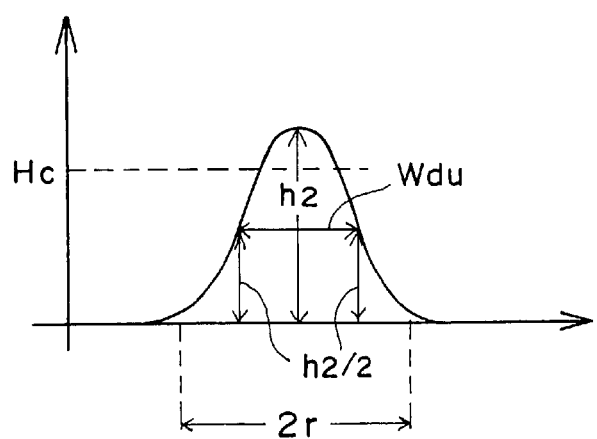

FIG. 5A is a plan view showing directions in which the transfer magnetic field is applied to the slave medium 2 and FIG. 5B shows a model intensity distribution in the direction of a tangent. Though only the slave medium 2 is shown in FIG. 5A, actually the transfer magnetic field is applied to the holder 10 in which the slave medium 2 and the upper and lower master information carriers 4 and 3 are accommodated in close contact with each other. The magnetic field generator 60 generates a transfer magnetic field Hdu across the gap 61 in parallel to the recording track in the direction substantially opposite to the direction of the initial-magnetization. As in the initial magnetization, by rotating the slave medium 2 once or more relatively to the transfer magnetic field Hdu, the transfer magnetic field Hdu parallel to the concentric recording tracks can be applied to over the entire recording track area.

The transfer magnetic field Hdu generated by the magnetic field generator 60 exhibits an intensity distribution on the surface 2b of the slave medium 2 in the direction of a tangent, having a peak at the center of the gap 61 as shown in FIG. 5B. Since the magnetic field has certain spread in a tangential direction as shown in FIG. 5B, an area of the track deviated from the point of contact between the track and the tangent undergoes a transfer magnetic field Hdu in a direction deviated from the direction of the track, as in application of the initial DC magnetic field Hin and the magnetization pattern of the area subjected to the magnetic field is disturbed.

In order to overcome this problem, the transfer magnetic field Hdu is limited to not larger than the diameter 2r of an innermost recording track Ta in the half-width Win of a curve representing an intensity distribution in the direction of a tangent of the innermost recording track Ta. By so setting the intensity of the transfer magnetic field Hdu, turbulence of the transfer magnetization pattern can be suppressed over the entire area of the recording track from the innermost track to the outermost track, whereby an optimal initial magnetization can be realized.

In the transfer magnetic field application system 11, the intensity of the transfer magnetic field is set to be not lower than about 0.6 times the coercive force Hc of the magnetic layer of the slave medium and not higher than about 1.3 times the coercive force of the magnetic layer of the slave medium (preferably 0.8 Hc to 1.2 Hc and more preferably 1 Hc to 1.1 Hc) on both the sides 2b and 2c of the slave medium 2.

FIG. 6 is an exploded perspective view of the holder 10.

As shown in FIG. 6, the holder 10 comprises a lower holder member 8 having a lower correcting member 6 which holds the lower master information carrier 3, for transferring the information to the lower magnetic layer (the magnetic layer on the lower side 2c) of the slave medium 2, under suction force and forces it flat and an upper holder member 9 having an upper correcting member 7 (the same as the lower correcting member 6 in structure) which holds the upper master information carrier 4, for transferring the information to the upper magnetic layer (the magnetic layer on the upper side 2b) of the slave medium 2, under suction force and forces it flat. The upper and lower holder members 9 and 8 presses the upper and lower master information carriers 4 and 3 respectively against the upper and lower magnetic layers of the slave medium 2 with the centers of the upper and lower master information carriers 4 and 3 and the slave medium 2 aligned with each other, thereby holding the upper and lower master information carriers 4 and 3 and the slave medium 2 in close contact with each other.

The lower and upper master information carriers 3 and 4 are respectively held under suction by lower and upper holder members 8 and 9 on the side opposite to the magnetic layer 3b and 4b carrying thereon the information to be transferred. In order to strengthen the close contact with the slave medium 2, small through holes extending from one side of the master information carrier to the other side may be formed in the master information carrier so that air trapped between the slave medium 2 and the master information carrier is purged therethrough at portions where the through holes do not interfere with the irregularity pattern representing the information to be transferred and do not communicate with suction holes (to be described later) of the correcting members 6 and 7.

The lower correcting member 6 is like a disc in shape and is sized according to the size of the master information carrier 3. The surface of the lower correcting member 6 which is brought into contact with the master information carrier 3 is formed into a suction face 6a whose surface is about 0.01 to 0.1 $\mu$m in centerline mean surface roughness Ra. About 25 to 100 suction holes 6b not larger than about 2 mm in diameter uniformly open in the suction face 6a. Though not shown, each of the suction holes 6b is connected to a vacuum pump through a vacuum passage which is led outside the lower holder member 8 through the lower correcting member 6. The back side (opposite to the magnetic layer) of the lower master information carrier 3 is forced flat along the suction face 6a under the suction force applied thereto through the suction holes 6b and thus the flatness of the lower master information carrier 3 is corrected. The upper correcting member 7 is the same as the lower correcting member 6 in structure, and will not be described here.

The lower and upper holder members 8 and 9 are like a disc in shape and one or both of them is movable in the axial direction toward and away from each other. The lower and upper holder members 8 and 9 are opened and closed by an opening/closing mechanism (a pressing mechanism, a fastener mechanism or the like) not shown, and pressed against each other at a predetermined pressure when closed. The lower and upper holder members 8 and 9 are provided with flanges 8a and 9a on their outer peripheries which are brought into abutment against each other to close its inside in an air-tight fashion when the lower and upper holder member 8 and 9 are closed. A locator pin 8b which engages with the central opening of the slave medium 2 to locate the slave medium 2 is erected at the center of the lower holder member 8.

Magnetic transfer of information to the slave medium 2 by the magnetic transfer apparatus in accordance with the embodiment described above using the initial magnetization system 1 and the transfer magnetic field application system 11 described above will be described, hereinbelow.

The slave medium 2 is first placed on the support table 5 of the initial magnetization system 1 and an initial DC magnetic field Hin is generated across the gap 51 of the electromagnet unit 50. The magnetic field Hin is parallel to a tangent of the recording tracks, and the initial DC magnetic field is applied to over the entire area of the recording tracks by rotating the support table 5 (or the slave medium 2) relatively to the magnetic field once or more in the direction of arrow A by rotating means (not shown). In order to initially magnetize the upper and lower magnetic layers of the slave medium 2 at one time, it is necessary for the intensity of the magnetic field Hin on the upper and lower sides 2b and 2c of the slave medium 2 to be not weaker than twice the coercive force Hc of the slave medium 2. When the strength of the magnetic field Hin on the lower side of the slave medium 2 is insufficient, it is necessary to turn over the slave medium 2 and to initially magnetize the magnetic layers on the opposite sides of the slave medium 2 in sequence.

Then, the master information carriers 3 and 4 and the slave medium 2 are set in the holder 10 with the lower master information carrier 3 and the upper master information carrier 4 respectively in close contact with the lower and upper magnetic layers of the slave medium 2 and the holder 10 is set to the transfer magnetic field application system 11. Each of the electromagnet units 60a and 60b opposed to the upper and lower surfaces of the holder 10 generates a transfer magnetic field Hdu in a direction opposite to the initial DC magnetic field. The transfer magnetic field Hdu is applied to over the entire area of the recording tracks by rotating the holder 10 relatively to the magnetic field once or more in the direction of arrow A, whereby the information represented by the irregularity patterns on the master information carriers 3 and 4 are magnetically transferred to the slave medium 2.

When, the initial DC magnetic field and the transfer magnetic field respectively applied by the initial magnetization means 1 and the transfer magnetic field application means 11 so that each of the magnetic fields is not larger than the diameter 2r of the innermost recording track Ta in the half-width of a curve representing an intensity distribution in the direction of a tangent of the innermost recording track Ta as described above, an optimal magnetic transfer can be realized over the entire area of the recording track from the innermost track Ta to the outermost track Tb.

The magnetic transfer will be described in more detail with reference to FIGS. 7A to 7C, hereinbelow. In FIGS. 7A to 7C, only the lower magnetic layer 2b and the lower master information carrier 3 are shown.

An initial DC magnetic field Hin is applied to the slave medium 2 to magnetize the magnetic layers 2b and 2c of the slave medium 2 in a direction parallel to the recording tracks as shown in FIG. 7A. Thereafter, the magnetic layer 3b of the lower master information carrier 3 and the magnetic layer 4b of the upper master information carrier 4 are brought into close contact with the lower and upper magnetic layers of the slave medium 2 by the holder 10. In this state, the upper and lower electromagnet units 60a and 60b of the transfer magnetic field application system 11 is operated to generate a transfer magnetic field Hdu in a direction opposite to the initial DC magnetic field as shown in FIG. 3B, thereby effecting magnetic transfer. As a result, the information represented by the irregularity pattern on each of the upper and lower master information carriers 3 and 4 is recorded on each of the magnetic layers 2b and 2c of the slave medium 2 as a magnetization pattern as shown in FIG. 7C.

In the case where the irregularity pattern representing information to be transferred is a negative pattern reverse to the positive pattern shown in FIGS. 7A to 7C, the information can be magnetically transferred to the slave medium 2 by reversing the directions of the initial DC magnetic field Hin and the transfer magnetic field Hdu.

FIG. 8 is a fragmentary perspective view for illustrating another example of the initial magnetization system. The initial magnetization system 1' shown in FIG. 5 differs from that 1 shown in FIG. 1 in that a pair of permanent magnets 70a and 70b are employed as a magnetic field generator in place of an electromagnet unit 50.

That is, the initial magnetization system 1' has a magnetic field generator 70 comprising a pair of permanent magnets 70a and 70b which are magnetized in a direction substantially perpendicular to the upper side 2b of the slave medium 2 and radially extend from an innermost track to an outermost track of the slave medium 2 so that opposite poles of the respective permanent magnets 70a and 70b are opposed to the surface of the slave medium 2. Also, in this initial magnetization system 1', the permanent magnets 70a and 70b are directly opposed to the slave medium 2 and the magnetic field generated between the permanent magnets 70a and 70b is directly applied to the slave medium 2. The permanent magnets 70a and 70b generates an initial DC magnetic field Hin in parallel to the direction of the recording tracks. Accordingly, by rotating the slave medium 2 once or more relatively to the permanent magnets 70a and 70b, the initial DC magnetic field Hin can be applied to over the entire area of the slave medium 2.

As in the first embodiment described above, the intensity of the initial DC magnetic field Hin applied to the slave medium 2 is set to be not weaker than twice the coercive force Hc of the magnetic layer of the slave medium 2 and to be not larger than the diameter 2r of an innermost recording track in the half-width of a curve representing an intensity distribution in the direction of a tangent of the innermost recording track on the surface of the slave medium 2.

This can be realized, for instance, by setting the distance w2 between the permanent magnets 70a and 70b to be not larger than the radius r of the innermost recording track and the distance h2 between the upper side 2b of the slave medium 2 and the permanent magnets 70a and 70b to be not larger than 10 mm (preferably not larger than 5 mm and more preferably not larger than 3 mm).

Figure 9:
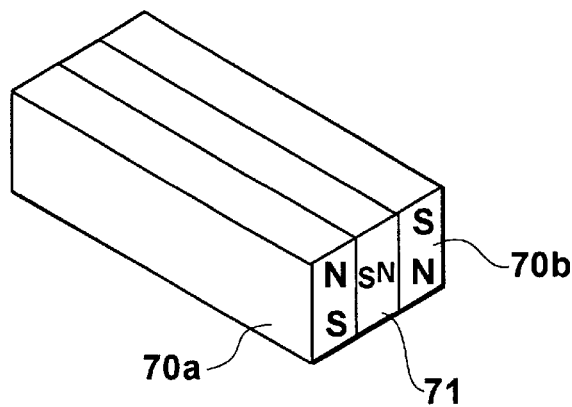
FIG. 9 is a perspective view showing another example of the magnetic field generator.

A third permanent magnet 71 magnetized in a direction perpendicular to the direction of magnetization of the permanent magnets 70a and 70b may be inserted between the permanent magnets 70a and 70b so that the third permanent magnet 71 generates a magnetic field directed in the same direction as the magnetic field generated by the permanent magnets 70a and 70b, as in a magnetic field generator 70' shown in FIG. 9. The magnetic field generated by the third permanent magnet 71 enhances the magnetic field generated by the permanent magnets 70a and 70b.

Figure 10A:
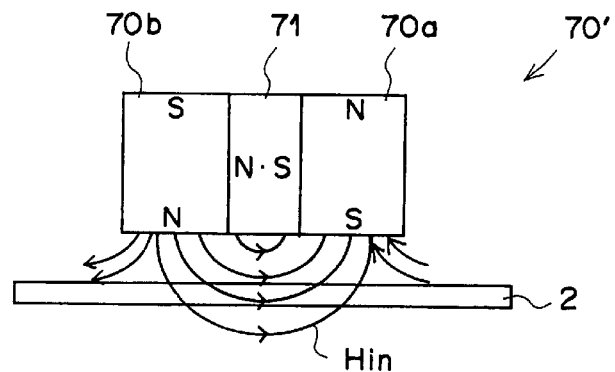
FIGS. 10A and 10B are views for illustrating the magnetic field generator shown in FIG. 9.
Figure 10B:
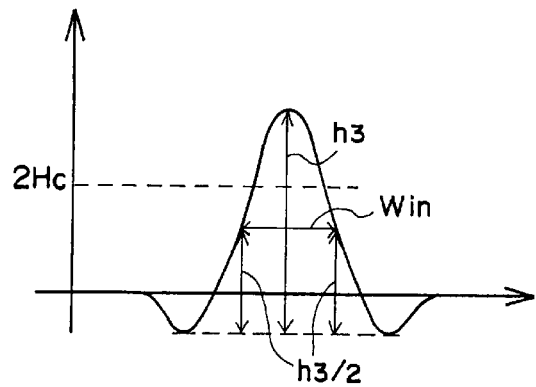

FIG. 10A is a side view showing the magnetic field generator 70' and FIG. 10B shows the intensity distribution, on the surface of the slave medium 2 in the direction of a tangent, of a magnetic field actually generated by the magnetic field generator 70'.

The magnetic field generated by the generator 70' exhibits an intensity distribution on the surface of the slave medium 2 in the direction of a tangent, having a peak at the center of the gap 51 as shown in FIG. 10B. Also in this example, by setting the initial DC magnetic field Hin to be not larger than the diameter 2r of an innermost recording track Ta in the half-width Win of a curve representing an intensity distribution in the direction of a tangent of the innermost recording track Ta, the same result can be obtained.

Though, in the embodiments described above, the slave medium (or the holder) is rotated relatively to the magnetic field generator to apply the magnetic field to over the entire area of the slave medium 2, it is possible to rotate the latter relatively to the former.

Further, though, in the embodiments described above, the surface of the slave medium (or the slave medium/master information carrier assembly) is held horizontal but the surface may be held vertical with the magnetic field generator opposed to the surface.

What is claimed is:

1. A magnetic transfer apparatus for magnetically transferring information represented by a pattern of a magnetic layer formed on a master information carrier to a magnetic layer of a slave medium comprising an initial magnetization means which applies an initial DC magnetic field to a disc-like slave medium while rotating the slave medium relatively to the initial DC magnetic field to initially magnetize the magnetic layer of the slave medium in one direction of concentric recording tracks thereof and a transfer magnetic field application means which applies a transfer magnetic field to the slave medium and the master information carrier in the direction opposite to the direction of the initial-magnetization while integrally rotating the slave medium and the master information carrier relatively to the transfer magnetic field with the initially-magnetized magnetic layer of the slave medium held in close contact with the magnetic layer on the master information carrier, wherein the improvement comprises that the initial DC magnetic field and the transfer magnetic field respectively applied by the initial magnetization means and the transfer magnetic field application means are not larger than the diameter of an innermost recording track in the half-width of a curve representing an intensity distribution in the direction of a tangent of the innermost recording track on the surface of the slave medium.

2. A magnetic transfer apparatus as defined in claim 1 in which the intensity of the initial DC magnetic field is not lower than the coercive force of the magnetic layer of the slave medium.

3. A magnetic transfer apparatus as defined in claim 2 in which the intensity of the initial DC magnetic field is not lower than 1.2 times the coercive force of the magnetic layer of the slave medium.

4. A magnetic transfer apparatus as defined in claim 3 in which the intensity of the initial DC magnetic field is not lower than about twice the coercive force of the magnetic layer of the slave medium.

5. A magnetic transfer apparatus as defined in claim 1 in which the intensity of the transfer magnetic field is not lower than about 0.6 times the coercive force of the magnetic layer of the slave medium and not higher than about 1.3 times the coercive force of the magnetic layer of the slave medium.

6. A magnetic transfer apparatus as defined in claim 1 in which each of the initial magnetization means and the transfer magnetic field application means is an electromagnet unit comprising a core having a gap which radially extends at least from an innermost track to an outermost track of the slave medium and a winding wound around the core.

7. A magnetic transfer apparatus as defined in claim 6 in which the gap in the core is not larger than half of the radius of the slave medium.

8. A magnetic transfer apparatus as defined in claim 7 in which the distance between the surface of the slave medium and the electromagnet unit is not larger than 10 mm.

9. A magnetic transfer apparatus as defined in claim 8 in which the distance between the surface of the slave medium and the electromagnet unit is not larger than 5 mm.

10. A magnetic transfer apparatus as defined in claim 9 in which the distance between the surface of the slave medium and the electromagnet unit is not larger than 3 mm.

11. A magnetic transfer apparatus as defined in claim 1 in which each of the initial magnetization means and the transfer magnetic field application means is a permanent magnet unit comprising a pair of permanent magnets which are magnetized in a direction substantially perpendicular to the upper side of the slave medium and disposed in parallel to each other with a gap radially extending from an innermost track to an outermost track of the slave medium so that opposite poles of the respective permanent magnets are opposed to the surface of the slave medium.

12. A magnetic transfer apparatus as defined in claim 11 in which the gap is not larger than half of the radius of the slave medium.

13. A magnetic transfer apparatus as defined in claim 12 in which the distance between the surface of the slave medium and the electromagnet unit is not larger than 10 mm.

14. A magnetic transfer apparatus as defined in claim 13 in which the distance between the surface of the slave medium and the electromagnet unit is not larger than 5 mm.

15. A magnetic transfer apparatus as defined in claim 14 in which the distance between the surface of the slave medium and the electromagnet unit is not larger than 3 mm.

16. A magnetic transfer apparatus as defined in claim 11 in which the permanent magnet unit is provided with a third permanent magnet which is magnetized in perpendicular to the direction of magnetization of the aforesaid permanent magnets and disposed between the aforesaid permanent magnets in a direction to enhance the magnetic field between the aforesaid permanent magnets.

* * * * *